(12) United States Patent
Lee et al.

(10) Patent No.: US 10,639,562 B2
(45) Date of Patent: *May 5, 2020

(54) SOLVENT SEPARATION APPARATUS AND SOLVENT SEPARATION METHOD

(71) Applicant: LG Chem, Ltd., Seoul (KR)

(72) Inventors: Sung Kyu Lee, Daejeon (KR); Joon Ho Shin, Daejeon (KR)

(73) Assignee: LG Chem, Ltd. (KR)

( * ) Notice: Subject to any disclaimer, the term of this patent is extended or adjusted under 35 U.S.C. 154(b) by 0 days.

This patent is subject to a terminal disclaimer.

(21) Appl. No.: 16/335,922

(22) PCT Filed: Sep. 20, 2017

(86) PCT No.: PCT/KR2017/010280
§ 371 (c)(1),
(2) Date: Mar. 22, 2019

(87) PCT Pub. No.: WO2018/066838
PCT Pub. Date: Apr. 12, 2018

(65) Prior Publication Data
US 2019/0308115 A1     Oct. 10, 2019

(30) Foreign Application Priority Data
Oct. 5, 2016   (KR) .................. 10-2016-0128120

(51) Int. Cl.
*B01D 3/00*         (2006.01)
*C08J 11/02*        (2006.01)
(Continued)

(52) U.S. Cl.
CPC ............... *B01D 3/007* (2013.01); *B01D 3/00* (2013.01); *B01D 3/009* (2013.01); *B01D 3/346* (2013.01);
(Continued)

(58) Field of Classification Search
CPC ........ B01D 3/007; B01D 3/38; B01D 5/0039; B01D 5/006; B01D 5/0075;
(Continued)

(56) References Cited

U.S. PATENT DOCUMENTS 4,406,750 A      9/1983   Irvin
4,783,242 A *   11/1988   Robbins ............... B01D 1/2856
                                                     159/24.3
(Continued)

FOREIGN PATENT DOCUMENTS

EP      0360890 A1    4/1990
JP      S63027506 A   2/1988
(Continued)

OTHER PUBLICATIONS

Search report from International Application No. PCT/KR2017/010280, dated Mar. 27, 2018.

*Primary Examiner* — Renee Robinson
(74) *Attorney, Agent, or Firm* — Lerner, David, Littenberg, Krumholz & Mentlik, LLP

(57) ABSTRACT

The present invention relates to a solvent separation apparatus and a solvent separation method, and the solvent separation apparatus and the solvent separation method according to the present application can reduce the used amount of cooling water and the used amount of steam, in a process of separating a polymer and a solvent.

8 Claims, 1 Drawing Sheet

(51) Int. Cl.
*B01D 5/00* (2006.01)
*B01D 3/34* (2006.01)
*B01D 3/38* (2006.01)
*C08J 11/06* (2006.01)
*C08L 101/00* (2006.01)
*C08F 6/10* (2006.01)
*C08J 11/14* (2006.01)
*C08F 2/01* (2006.01)
*C08F 236/06* (2006.01)

(52) U.S. Cl.
CPC .............. *B01D 3/38* (2013.01); *B01D 5/006* (2013.01); *B01D 5/0039* (2013.01); *B01D 5/0075* (2013.01); *C08F 2/01* (2013.01); *C08F 6/10* (2013.01); *C08J 11/02* (2013.01); *C08J 11/06* (2013.01); *C08J 11/14* (2013.01); *C08L 101/00* (2013.01); *C08F 236/06* (2013.01); *C08J 2309/00* (2013.01); *C08J 2309/02* (2013.01); *C08J 2309/06* (2013.01); *Y02P 20/124* (2015.11); *Y02P 70/34* (2015.11)

(58) Field of Classification Search
CPC ..... C08F 6/10–12; C08F 236/06; C08J 11/02; C08J 11/06
See application file for complete search history.

(56) References Cited

U.S. PATENT DOCUMENTS

| | | |
|---|---|---|
| 2011/0257342 A1 | 10/2011 | Paul et al. |
| 2016/0187036 A1 | 6/2016 | Lee et al. |
| 2016/0319704 A1 | 11/2016 | Kim et al. |
| 2017/0036139 A1 | 2/2017 | Lee |
| 2018/0319948 A1 | 11/2018 | Lee et al. |

FOREIGN PATENT DOCUMENTS

| | | |
|---|---|---|
| JP | 2011528053 A | 11/2011 |
| JP | 201540187 A | 3/2015 |
| KR | 20040042561 A | 5/2004 |
| KR | 20130028382 A | 3/2013 |
| KR | 20150000422 A | 1/2015 |
| KR | 20150118446 A | 10/2015 |
| KR | 20160004146 A | 1/2016 |
| KR | 20160004148 A | 1/2016 |
| WO | 2009126277 A2 | 10/2009 |
| WO | 2016003215 A1 | 1/2016 |
| WO | 2017217709 A1 | 12/2017 |

\* cited by examiner

[Figure 1]
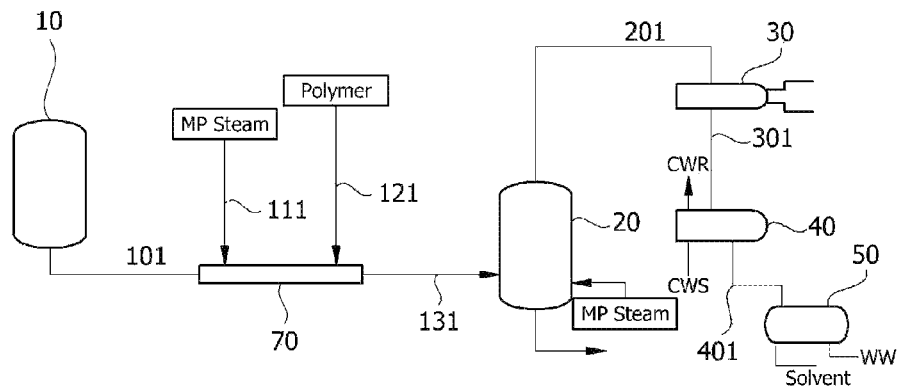
PRIOR ART
[Figure 2]
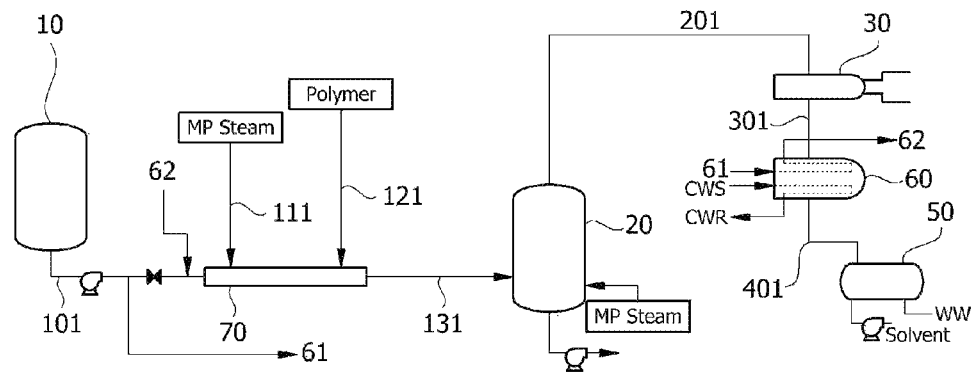

SOLVENT SEPARATION APPARATUS AND SOLVENT SEPARATION METHOD

CROSS-REFERENCE TO RELATED APPLICATIONS

The present application is a national phase entry under 35 U.S.C. § 317 of International Application No. PCT/KR2017/010280 filed on Sep. 20, 2017, which claims priority from Korean Patent Application No. 10-2016-0128120 filed on Oct. 5, 2016, the disclosures of which are incorporated herein by reference in its entirety.

TECHNICAL FIELD

The present application relates to a solvent separation apparatus and a solvent separation method for separating a mixture of a polymer and a solvent.

BACKGROUND ART

In many processes of producing polymers or petrochemicals, a stripping process has been operated as a process following polymerization. The stripping process uses a method such as steam stripping and distillation in order to recover unreacted monomers and solvents after reaction and reuse them. A description of the steam stripping for recovering solvents in this method is well described in Korean Laid-Open Patent Publication No. 2004-0042561. In a general steam stripping method, the polymer solution is introduced into a high-temperature water and the solvent is volatilized and removed together with water vapor using steam to recover the polymer.

The stripping unit used for stripping is for evaporating and separating mixed materials of two or more components present in a feedstock by the boiling point difference. At the upper part of a distillation system, a low-boiling material (high volatile component) is evaporated and separated in a form of the upper vapor and at the lower part of the distillation system, a high-boiling material (low volatile component) is separated in a form of condensate. The low-boiling material and the high-boiling material may also be each a single component or a mixture of two or more components.

As a representative process for separating a mixture of a polymer and a solvent, and the like using such a stripping unit, there is a synthetic rubber production process. The synthetic rubber refers to a polymer material having the same or similar physical properties as natural rubber, and includes butadiene rubber, acrylonitrile butadiene rubber, styrene butadiene rubber, solution styrene butadiene rubber or ultra high-cis polybutadiene rubber, and the like.

The attached FIG. 1 is a schematic diagram illustrating a solvent separation apparatus used in a general stripping process. As shown in FIG. 1, typically, in the conventional stripping process, water supplied from the water tank (10) and steam are mixed with a mixture of polymerized polymer and a solvent and supplied to the stripping unit (20). The top stream (201) discharged from the top region of the stripping unit (20) is condensed in the condenser (30) and then introduced into an oily water separator (50) through a cooler (40). The solvent separation apparatus uses a middle pressure steam (MP) as a heat source, and in this process, a large amount of energy is consumed.

Therefore, in order to reduce the energy consumed in the solvent separation process, there is a need for a method capable of recovering and using the discarded waste heat.

DISCLOSURE

Technical Problem

The present application is intended to provide a solvent separation apparatus and a solvent separation method using the solvent separation apparatus.

Technical Solution

The present application relates to a solvent separation apparatus and a solvent separation method. According to an exemplary solvent separation apparatus of the present application and the solvent separation method using the solvent separation apparatus, the waste heat of oil mist discharged from the top region of the stripping apparatus for separating the product after reaction into the polymer and the solvent in the polymer production process is recovered, and used in the process of transferring the product to the stripping unit after the synthetic rubber production reaction, whereby the energy can be reduced by recovering the discarded waste heat.

In this specification, the term 'and/or' is used as a meaning to include at least one or more of components listed before and after.

In this specification, the term "piping system" may mean a structure that includes pipes or lines connecting devices, where "lines" may be substantially the same sense as pipes, the "stream" may mean movement of a fluid through a line or a pipe, and the line, pipe, and stream herein may share the same reference numeral.

The terms, such as "first," "second," "third," "fourth," "one side," and "other side," herein are used to distinguish one component from other components, where each component is not limited by the terms. Hereinafter, in explaining the present application, detailed descriptions of known general functions or configurations related thereto are omitted.

Hereinafter, the solvent separation apparatus and the solvent separation method of the present application will be described in detail.

The solvent separation apparatus and the solvent separation method of the present application can heat water used for transferring the synthetic rubber product to the stripping unit by heat exchange with the top stream discharged from the top region of the stripping unit for separating the product into the polymer and the solvent after the reaction in the synthetic rubber production process, and supply the water into the stripping unit. In this specification, "stripping" means separation and removal of gas dissolved in liquid, which may be performed by, for example, direct contact with steam, inert gas or air, and the like, and a method such as heating and pressing, and the stripping herein can be used as the same sense as stripping, dissipating or separating.

The synthetic rubber production process of the present application comprises a process of producing butadiene rubber (BR), acrylonitrile-butadiene rubber (NBR), styrene-butadiene rubber (SBR), solution styrene-butadiene rubber (SSBR), ultra high-cis polybutadiene rubber, and the like. The butadiene rubber (BR), acrylonitrile-butadiene rubber (NBR), styrene-butadiene rubber (SBR), solution styrene-butadiene rubber (SSBR), ultra high-cis polybutadiene rubber, and the like can be produced by continuous polymerization with a method of solution polymerization or emulsion polymerization.

When the synthetic rubber is produced using the solution polymerization, a viscous material solution, which is a mixture of the polymer and the solvent after the polymerization reaction, is separated to the solvent and the polymer by stripping with steam. Also, when the synthetic rubber is produced using emulsion polymerization, the polymer produced after the polymerization reaction and the unreacted monomer and the solvent are separated by stripping after degassing, respectively. The solvent may be an organic solvent, and may also be a saturated hydrocarbon having 2 to 12 carbon atoms or 4 to 8 carbon atoms, and preferably, may include normal hexane.

As such, water is heated by heat exchange with oil mist discharged from the top region of the stripping unit used in the process of producing butadiene rubber (BR), acrylonitrile-butadiene rubber (NBR), styrene-butadiene rubber (SBR), solution styrene-butadiene rubber (SSBR), ultra high-cis polybutadiene rubber, and the like by a method of solution polymerization or emulsion polymerization, and supplied to a process for transferring the mixture of the polymer and the solvent, which is a product of production reaction, to the stripping unit, whereby the used amount of cooling water can be reduced and the energy used for heating water can be reduced.

Hereinafter, the present application will be described in detail with reference to the accompanying drawings.

The accompanying drawings illustrate exemplary embodiments of the present application, which are only provided to assist in understanding the present application, whereby the technical scope of the present application is not limited.

FIG. 2 is a diagram schematically showing a solvent separation apparatus according to an exemplary embodiment of the present application. Referring to FIG. 2, the solvent separation apparatus according to the present application comprises a stripping unit, a water tank and a piping system.

For example, the solvent separation apparatus may comprise a water tank (10), a stripping unit (20), a mixing zone (70), a heat exchange zone (60) and a piping system.

The "water tank" is a device capable of supplying water, and its shape and structure are not particularly limited.

The "stripping unit" is a device capable of separating multi-component materials contained in raw materials by each boiling point difference, or a stripping unit for separating gas in the raw material and materials to be separated from raw materials. As the stripping unit (20), a stripping unit having various forms can be used in the present application in consideration of boiling points or the like of components of a raw material to be introduced or components to be separated, and the like.

The stripping unit of the present application can remove the solvent by introducing a polymer solution into hot water and volatilizing the solvent together with water vapor using steam. The stripping unit may be configured such that the polymer solution containing the solvent to be recovered and the stream of the steam providing heat required upon recovering flow in opposite directions (counter current) to each other. In the process of recovering the polymer by stripping, the stripping unit can be filled therein with water in order to maintain a constant S/C (slurry content, mass of the rubber-like polymer in the stripping unit/total mass of the contents excluding the solvent in the stripping unit).

In one example, as the stripping unit (20) or a stripping unit that can be used as a stripper, for example, a distillation column or device having general structure can be used, and a stripping unit in a form that two stripping units are connected to each other can be used.

In one example, the stripping unit (20) may comprise a solvent inlet to which a mixture comprising a polymer and a solvent is introduced, a polymer outlet for discharging a bottom product of the stripping unit (20) and a solvent outlet for discharging a top product of the stripping unit (20).

The solvent inlet may be located at the lower or middle part of the stripping unit, the polymer outlet may be located at the lower part of the stripping unit (20) and/or at the bottom of the stripping unit, and the solvent outlet part may be located at the upper part of the stripping unit (20) and/or the top of the stripping unit. In this specification, the "upper part" may mean a relatively upper portion within the stripping unit, and more specifically, when the stripping unit is vertically bisected in a longitudinal direction, for example, in a length or height direction of the stripping unit, it may mean the upper part of two divided regions. Here, the "lower part" may also mean a relatively lower portion within the stripping unit, and more specifically, when the stripping unit is vertically bisected in a longitudinal direction, for example, in a length or height direction of the stripping unit, it may mean the lower part of two divided regions. In addition, the "top" of the stripping unit may mean the topmost portion of the stripping unit and may be located at the above-described upper part of the stripping unit, and the "bottom" of the stripping unit may mean the bottommost portion of the stripping unit and may be located at the above-described lower part of the stripping unit. In one example, there may be the middle part region between the upper part and the lower part of the stripping unit, and the upper part, middle part and lower part regions of the stripping unit may be used herein as relative concepts to each other. For example, when the stripping unit is bisected in the longitudinal direction, the stripping unit can be divided into upper part and lower part regions, and in this case, the stripping can occur in the upper part region and the lower part region. In addition, when the stripping unit is trisected in the longitudinal direction, the stripping unit can be divided into the upper part, the middle part and the lower part, and in this case, the stripping can occur in all the upper part, middle part and lower part regions.

The piping system may comprise: a first line (101) connecting a water outlet of the water tank and a mixing zone; a second line (131) connecting the mixing zone and an inlet of the stripping unit; and a third line (201+301) formed so that a mixture of solvent and water can be discharged from the solvent outlet of the stripping unit.

In the first line (101), an oily water outlet and an oily water inlet are formed, and the piping system may further comprise a fourth line (61+62) formed so that a part of water moving through the first line (101) can be discharged through the oily water outlet and then recovered again to the first line (101) through the oily water inlet. The third and fourth lines may be configured to cross through via the heat exchange zone such that the water discharged through the oily water outlet may be heat-exchanged with a mixture of solvent and water moving through the third line (201+301) and then recovered to the oily water inlet.

The "part" of the water moving through the first line (101) means a state in which a fluid stream through the fourth line is present in a water stream of the first line discharged from the outlet of the water tank, where, for example, a ratio (B/A) of the stream (B) flowing into the heat exchange zone through the fourth line to the outflow stream (A) discharged from the outlet of the water tank may be 0.1 or more, 0.2 or more, 0.3 or more, 0.4 or more, for example, 0.5 or more. When the ratio (B/A) is 0, it may mean a state where the water stream flowing out of the water tank does not flow into the fourth line. The upper limit of the ratio (B/A) of the stream (B) flowing into the heat exchange zone through the fourth line to the outflow stream (A) discharged from the outlet of the water tank may be 1, and when the ratio (B/A) of the stream (B) flowing into the heat exchange zone through the fourth line to the outflow stream (A) discharged from the outlet of the water tank is 1, it may mean a state where the entire outflow stream discharged from the outlet of the water tank flows into a heat exchanger through the fourth line.

In one example, the first line (101) may comprise a water supply line (101), a steam supply line (111) and a polymer supply line (121). For example, the water supply line (101), the steam supply line (111), the polymer supply line (121), the second line (131) and the stripping unit (20), supplied from the water tank (10) may be connected to one other through pipes. In one example, the water supplied from the water tank (10) to the first line (101) may be fluidically connected so that it may be mixed with the steam supply line (111) and the polymer supply line (121) in the mixing zone (70) and then may flow into the stripping unit (20) through the second line (131). The mixing zone (70) may refer to a device capable of mixing a plurality of streams simultaneously or sequentially, and may be a structure composed of a plurality of pipes and valves, or may mean a structure in which a device such as one or more inline mixers is combined, but is not limited thereto.

The third line (201+301) may be formed to connect the solvent outlet of the stripping unit and the heat exchange zone. Also, the fourth line (61+62) may be formed to connect the oily water outlet of the first line with the heat exchange zone and the oily water inlet of the first line. The mixture of the solvent and the water flowing out of the solvent outlet of the stripping unit (20) flows into the heat exchange zone through the third line (201+301), where it may be heat-exchanged with the water introduced through the fourth line (61+62) from the first line (101) through the heat exchange zone.

In one example, the heat exchange zone may comprise a condensing zone and a sub-cooling zone. The condensing zone may be a zone where the third line and the fourth line may be cross-heat exchanged therein, and the sub-cooling zone may further cool the third line heat-exchanged in the condensing zone by introducing external cooling water.

The condensing zone of the heat exchange zone may be a zone for heat-exchanging a mixture of a solvent and water discharged from the solvent outlet of the stripping unit (20) through the third line with water introduced from the first line through the fourth line. By heat-exchanging the water introduced through the fourth line in the condensing zone introducing it into the first line, the energy required for transferring the mixture of the polymer and the solvent can be reduced. Also, the sub-cooling zone of the heat exchange zone may be a zone where the mixture of the solvent and the water after heat exchange in the condensing zone is cooled by a method such as contacting the cooling water introduced from the outside. The mixture of the solvent and the water may be cooled to a temperature where it can be separated in the sub-cooling zone and then introduced into the oily water separator (50) through an oily water discharge line (401). The oily water separator (50) may refer to a device for separating a solvent and water, and various known devices such as an open type and a tank type may be used. By cooling the mixture of the solvent and the water heat-exchanged in the condensing zone in the sub-cooling zone, the amount of cooling water supplied to cool the mixture of solvent and water can be reduced.

In another example, the heat exchange zone may be a heat exchanger that simultaneously comprises a condensing zone and a sub-cooling zone in the same shell. The heat exchanger (60) may be a heat exchanger such as a shell-and-tube heat exchanger, a spiral heat exchanger or a plate heat exchanger in consideration of heat exchange capacity, performance, prices and installation spaces, and the like, and preferable, may be a 1-shell-2-process tube heat exchanger in which two or more tubes are formed in the same shell, but the structure and the type are not particularly limited as long as it comprises the condensing zone and the sub-cooling zone.

The "heat exchanger" is a device which is installed separately outside the stripping unit and performs heat exchange such that heat transfer between two fluid streams having different temperatures from each other occurs smoothly, and for example, the heat exchanger (60) may be a device for introducing the mixture of the solvent and the water flowing out of the solvent outlet of the stripping unit (20) into the heat exchanger (60) through the third line (201+301), and heat-exchanging it with the water introduced through the fourth line (61+62) from the first line (101) through the heat exchanger (60).

In one example, the solvent separation apparatus according to the present application may further comprise a condenser (30) on the second line. The "condenser" is a device installed separately from the stripping unit (20), which may mean a device for cooling a material discharged from the stripping unit (20) by a method such as contacting it with the cooling water introduced from the outside. The condenser (30) may be provided between the solvent outlet of the stripping unit and the heat exchanger (60). By providing the condenser, it is possible to control a temperature of the mixture of the solvent and the water discharged into the solvent outlet of the stripping unit (20) and flowing into the heat exchanger (60), and the mixture may be heat-exchanged with the water flowing into the third line to improve waste heat recovery efficiency.

In one example, the solvent separation apparatus of the present application may satisfy Equation 1 below.

$$|T_c - T_e| \leq 40° \text{ C.} \qquad [\text{Equation 1}]$$

In Equation 1 above, Tc represents a temperature of a stream of the third line flowing out of the condenser, and Te represents a temperature of a stream of the fourth line flowing out of the heat exchanger.

In the solvent separation apparatus, by controlling a difference between the temperature of the third line (301) flowing out of the condenser (30) and the temperature of the stream of the fourth line (62) flowing out of the heat exchanger (60) in the range of Equation 1 above, the used amount of steam for transferring the mixture of the polymer and the solvent, and the like, which is a product after the reaction for producing synthetic rubber, to the stripping unit (20) can be reduced. In one example, the difference between the temperature of the stream of the third line (301) flowing out of the condenser (30) and the temperature of the stream of the fourth line (62) flowing out of the heat exchanger (60) is not particularly limited as long as it is within the above-described range, and for example, may be 40° C. or lower, 30° C. or lower, or 20° C. or lower, and the lower limit is not particularly limited, but for example, may be 0° C. or higher. The temperature of the stream flowing out of the condenser (30) is not particularly limited as long as it satisfies Equation 1 above, but it may be 70 to 100° C., for example, 80 to 100° C., 90 to 100° C., 70 to 90° C. or 80 to 90° C. In addition, the temperature of the outflow stream of the fourth line (62) flowing out of the heat exchanger (60) is not particularly limited as long as it satisfies Equation 1 above, but it may be 50 to 80° C., for example, 60 to 80° C., 70 to 80° C., 50 to 70° C., or 60 to 70° C.

The present application also relates to a solvent separation method. The solvent separation method may be a method of separating the polymer and the solvent using the above-described solvent separation apparatus. The exemplary method may comprise a step of heat-exchanging water introduced from the oily water outlet of the first line into the heat exchange zone through the fourth line with a mixture of a solvent and water discharged from the stripping unit through the third line and introducing it into the inlet of the first line.

In the solvent separation method according to one embodiment of the present application, water supplied from the water tank (10) through the first line (101), and steam introduced through the steam supply line (111) and the mixture of the polymer and the solvent introduced through the polymer supply line (121) may be introduced into the mixing zone (70) and mixed, and introduced into the stripping unit (20) through the second line (121). The mixture of the solvent and the water flowing out of the solvent outlet of the stripping unit (20) flows into the heat exchanger (60) through the third line, where it can be heat-exchanged with the water introduced from the first line through the fourth line.

The water introduced through the fourth line may be heat-exchanged with a mixture of a solvent and water of the third line in the heat exchanger and then introduced into the first line through the fourth line. By heat-exchanging the water introduced through the fourth line and introducing it into the first line, the energy required for transferring the mixture of the polymer and the solvent can be reduced. In addition, by being heat-exchanged with the water flowing into the fourth line, the used amount of cooling water for cooling the mixture of the solvent and the water flowing into the third line can be reduced.

In one example, the solvent separation method according to the present application may further comprise a step of passing the mixture of the solvent and the water discharged through the third line from the stripping unit through the condenser for condensing the mixture of the solvent and the water before it is heat-exchanged with the water introduced from the first line through the fourth line. By comprising the step of passing through the condenser, the heat exchange efficiency of the water flowing into the fourth line with the mixture of the solvent and the water discharged into the solvent outlet of the stripping unit can be improved.

In one example, the temperature (Tc) of the stream of the third line (301) discharged from the condenser (30) and the temperature (Te) of the stream of the fourth line (62), which is heat-exchanged in the heat exchanger (60) and discharged, can be adjusted to satisfy Equation 1 below.

$|Tc-Te| \leq 40° C.$  [Equation 1]

In Equation 1 above, Tc represents a temperature of a stream of the third line flowing out of the condenser, and Te represents a temperature of a stream of the fourth line flowing out of the heat exchanger.

In the solvent separation apparatus, by controlling a difference between the temperature of the third line (301) flowing out of the condenser (30) and the temperature of the stream of the fourth line (62) flowing out of the heat exchanger (60) in the range of Equation 1 above, the used amount of steam for transferring the mixture of the polymer and the solvent, and the like, which is a product after the reaction for producing synthetic rubber, to the stripping unit (20) can be reduced. In one example, the difference between the temperature of the stream of the third line (301) flowing out of the condenser (30) and the temperature of the stream of the fourth line (62) flowing out of the heat exchanger (60) is not particularly limited as long as it is within the above-described range, and for example, may be 40° C. or lower, 30° C. or lower, or 20° C. or lower, and the lower limit is not particularly limited, but for example, may be 0° C. or higher. The temperature of the stream flowing out of the condenser (30) is not particularly limited as long as it satisfies Equation 1 above, but it may be 70 to 100° C., for example, 80 to 100° C., 90 to 100° C., 70 to 90° C. or 80 to 90° C. In addition, the temperature of the outflow stream of the fourth line (62) flowing out of the heat exchanger (60) is not particularly limited as long as it satisfies Equation 1 above, but it may be 50 to 80° C., for example, 60 to 80° C., 70 to 80° C., 50 to 70° C., or 60 to 70° C.

The solvent separation method of the present application may be a method of separating butadiene rubber (BR), acrylonitrile-butadiene rubber (NBR), styrene-butadiene rubber (SBR), solution styrene-butadiene rubber (SSBR), ultra high-cis polybutadiene rubber, and the like, which are products of synthetic rubber production processes, from a solvent.

The product of the synthetic rubber production process is discharged in a state where the polymer and the solvent are mixed after a polymerization reaction, which can be separated using the solvent separation method according to the present application. In one example, the solvent may be an organic solvent and may also be a saturated hydrocarbon having 2 to 12 carbon atoms or 4 to 8 carbon atoms, and preferably, may include normal hexane.

Advantageous Effects

According to the present application, the waste heat from the heat exchanger of the stripping unit is recovered and supplied to transfer the mixture of the polymer and the solvent, which is a product of the polymerization reaction, whereby the energy can be significantly reduced as compared to the conventional stripping process.

BRIEF DESCRIPTION OF DRAWINGS

FIG. 1 is a configuration diagram for explaining a solvent separation process of a conventional stripping unit for separating a polymer and a solvent.

FIG. 2 is a configuration diagram of a solvent separation apparatus according to an embodiment of the present application.

BEST MODE

Hereinafter, the present application will be described in more detail by way of examples according to the present application and comparative examples that do not comply with the present application, but the scope of the present application is not limited by the following examples.

Example

As illustrated in FIG. 2, the water introduced from the water tank (10) through the first line (101) and the steam flowing into the steam supply line (111) and the mixture of the polymer and the solvent introduced through the polymer supply line (121) were mixed in the mixing zone (70) and introduced into the lower inlet of the stripping unit (20)

through the second line (131). The polymer was stripped using the steam supplied from the lower part of the stripping unit (20), and the mixture of the solvent and the water was discharged through the solvent outlet of the stripping unit (20). The temperature of the mixture of the solvent and the water flowing out of the solvent outlet of the stripping unit (20) was 96.16° C., the flow rate was 38,000 kg/hr, the pressure was 0.8 kg/sqcmg, and the mixing ratio of the solvent and the water was 15 wt % of water and 85 wt % of normal hexane. The mixture of the solvent and the water discharged through the solvent outlet of the stripping unit (20) was condensed in the condenser (30) and then introduced into the heat exchanger (60) through the third line (201+301). The stream (301) of the mixture of the solvent and the water flowing into the heat exchanger was 90.00° C., the flow rate was 38,000 kg/hr and the pressure was 0.8 kg/sqcmg. The temperature of the water flowing into the heat exchanger (60) through the fourth line (61) was 25° C., the flow rate was 55,000 kg/hr and the pressure was 4.5 kg/sqcmg. A 1-shell-2-process tube type heat exchanger was used as the heat exchanger (60), and the mixture of the solvent and the water introduced through the third line (201+301) was first heat-exchanged with the water introduced through the fourth line (61+62) and then further cooled using external cooling water flowing into the heat exchanger (60). The cooling water was supplied at a temperature of 32° C., a flow rate of 27,000 kg/hr and a pressure of 4.5 kg/sqcmg. The water of the fourth line (62) flowing into the first supply line (101) after heat exchange in the heat exchanger (60) had a temperature of 70° C., a flow rate of 55,000 kg/hr and a pressure of 4.45 kg/sqcmg, and the temperature of the cooling water flowing out of the heat exchanger was about 42° C., the flow rate was 27,000 kg/hr and the pressure was 4.44 kg/sqcmg. The stream (401) of the mixture of the solvent and the water flowing into the oily water separator (50) after the heat exchange with the cooling water had a temperature of 43° C., a flow rate of 38,000 kg·hr and a pressure of 0.77 kg/sqcmg.

Comparative Example

As illustrated in FIG. 1, the mixture of the solvent and the water discharged from the top region of the stripping unit (20) was condensed through the condenser (30), and then cooled using the cooling water flowing into the cooler (40) and introduced into the oily water separator (50), and the waste heat from the cooling water supplied to the condenser (30) was discarded. The solvent was separated under the same conditions as those of Example except that the temperature of the cooling water flowing into the cooler (40) was 32° C. and the flow rate was 51,000 kg/hr, and the temperature of the cooling water flowing out of the cooler was about 42° C. and the flow rate was 51,000 kg/hr.

TABLE 1

|  | Cooling Water Supply (ton/hour) | Used Amount of Steam (ton/hour) |
| --- | --- | --- |
| Example | 270 | 1.5 |
| Comparative Example | 510 | 6.0 |

As shown in Table 1, in the case of performing stripping using the solvent separation apparatus and the solvent separation method of the present application, it can be confirmed that in cooling the mixture of the solvent and the water at the same flow rate and temperature, the used amount of cooling water of at most 47% can be reduced and the used amount of steam of at most 75% can be reduced.

The invention claimed is:

1. A method for separating a polymer and a solvent using a solvent separation apparatus comprising
a stripping unit in which a solvent outlet, a polymer outlet and an inlet are formed;
a water tank having a water outlet; a heat exchange zone; a mixing zone for mixing water in the water tank with a polymer solution and a piping system,
wherein the piping system comprises a first line connecting the water outlet and the mixing zone, a second line connecting the mixing zone and the inlet of the stripping unit; and a third line configured so that a mixture of a solvent and water can be discharged from the solvent outlet of the stripping unit,
wherein in the first line, an oily water outlet and an oily water inlet are formed, the piping system further comprises a fourth line configured so that a part of the water moving through the first line can be discharged through the oily water outlet and then recovered to the first line through the oily water inlet, and the third and fourth lines are configured to cross through via the heat exchange zone such that the water discharged through the oily water outlet can be heat-exchanged with the mixture of the solvent and the water moving through the third line and then recovered to the oily water inlet,
the method comprising:
mixing the water from the water tank with a polymer solution to form a mixture, wherein the polymer solution comprises the polymer and the solvent;
supplying the mixture to the stripping unit to separate the polymer and the solvent;
heat-exchanging the water introduced from the oily water outlet of the first line into the heat exchange zone through the fourth line with the mixture of the solvent and the water discharged from the stripping unit through the third line to form a heat-exchanged water, and
introducing the heat-exchanged water into the inlet of the first line.

2. The solvent separation method according to claim 1, further comprising:
passing the mixture of the solvent and the water discharged through the third line from the stripping unit through the condenser for condensing the mixture of the solvent and the water before the mixture of the solvent and the water is heat-exchanged with the water introduced from the first line through the fourth line.

3. The solvent separation method according to claim 2, wherein a stream of the fourth line flowing out of the heat exchanger and a stream of the third line flowing out of the condenser are adjusted so as to satisfy Equation 1 below:

$$|Tc-Te| \leq 40° C. \qquad \text{[Equation 1]}$$

wherein, Tc represents a temperature of the stream of the third line flowing out of the condenser, and Te represents a temperature of the stream of the fourth line flowing out of the heat exchanger.

4. The solvent separation method according to claim 3, wherein the temperature of the stream of the third line flowing out of the condenser is from 70 to 100° C.

5. The solvent separation method according to claim 3, wherein the temperature of the stream of the fourth line flowing out of the heat exchanger is from 50 to 80° C.

6. The solvent separation method according to claim 2, further comprising:
 cooling the stream of the third line passing through the condenser and the heat exchanger to separate the solvent and the water.

7. The solvent separation method according to claim 1, wherein the polymer comprises butadiene rubber, acrylonitrile butadiene rubber, styrene butadiene rubber, solution styrene butadiene rubber or ultra high-cis poly butadiene rubber.

8. The solvent separation method according to claim 1, wherein the solvent comprises an organic solvent.

* * * * *